(12) United States Patent
Kesterman et al.

(10) Patent No.: US 6,371,154 B1
(45) Date of Patent: Apr. 16, 2002

(54) APPARATUS AND SYSTEM FOR CONTAINMENT

(75) Inventors: James E. Kesterman, Hamilton County; Eugene E. Schneider, Butler County, both of OH (US)

(73) Assignee: Fisces by OPW, Inc., Hamilton, OH (US)

( * ) Notice: Subject to any disclaimer, the term of this patent is extended or adjusted under 35 U.S.C. 154(b) by 0 days.

(21) Appl. No.: 09/398,662

(22) Filed: Sep. 17, 1999

(51) Int. Cl.⁷ .................... F16L 37/08; F16L 39/00
(52) U.S. Cl. ............ 137/315.01; 285/252; 285/331; 285/903
(58) Field of Search .............. 137/312, 315.01; 138/109, 113, 114; 285/236, 7, 242, 252, 258, 331, 903

(56) References Cited

U.S. PATENT DOCUMENTS

| | | |
|---|---|---|
| 548,706 A | 10/1895 | Gundermann |
| 621,108 A | 3/1899 | Leonard |
| 887,850 A | 5/1908 | Rollins |
| 980,901 A | 1/1911 | Ballantyne .................. 285/208 |

(List continued on next page.)

FOREIGN PATENT DOCUMENTS

| | | |
|---|---|---|
| DE | 4014684 | 9/1990 |
| DE | 19723410 | 12/1998 |
| EP | 381981 | 8/1990 |
| EP | 296417 | 6/1999 |
| GB | 0115310 | 12/1917 |
| GB | 0505692 | 5/1939 |
| GB | 0512256 | 8/1939 |
| WO | WO 9007074 | 6/1990 |
| WO | WO 9320372 | 10/1993 |

OTHER PUBLICATIONS

Promax, Inc., Promax Protection Product Guide/Price List, 1994, New Castle, Delaware.
Environ Products, Inc., Eviron Products Price List, Publication No. PL–1007, Jun. 1, 1994, Lionville, Pennsylvania.

(List continued on next page.)

Primary Examiner—George L. Walton
(74) Attorney, Agent, or Firm—Dinsmore & Shohl LLP

(57) ABSTRACT

A fitting for conduit comprising a body and an acceptor. The body has a wall and a throughbore. The acceptor is disposed along the wall and is capable of providing a sealing interface between the throughbore and the conduit. In one embodiment, the acceptor of the fitting receives a portion of at least one wall of a conduit, and a sealing interface is provided between the throughbore of the body of the fitting and a flow passage of the conduit to form a containment system. In another embodiment, the throughbore is capable of allowing a primary conduit and a flow passage of a secondary conduit to communicate therethrough. According to this embodiment, the acceptor receives a portion of a wall of the secondary conduit and a sealing interface is provide between the throughbore and the flow passage of the secondary conduit to form a secondary containment system.

33 Claims, 13 Drawing Sheets

U.S. PATENT DOCUMENTS

| | | | |
|---|---|---|---|
| 1,978,958 A | | 10/1934 | Robinson |
| 2,132,636 A | | 10/1938 | Maahs |
| 2,277,885 A | | 3/1942 | Rodanet |
| 2,320,636 A | | 6/1943 | Miller |
| 2,348,490 A | | 5/1944 | Newman et al. |
| 2,454,465 A | | 11/1948 | Leo et al. |
| 2,827,639 A | | 3/1958 | Schmidt |
| 3,408,091 A | * | 10/1968 | Zylstra .......................... 285/7 |
| 3,514,220 A | * | 5/1970 | Hahn, Jr. ..................... 138/114 |
| 3,863,960 A | | 2/1975 | Andersson ............... 285/140.1 |
| 3,973,789 A | | 8/1976 | Kunz et al. |
| 4,094,358 A | | 6/1978 | Neveux ................... 285/140.1 |
| 4,141,477 A | | 2/1979 | Hengesbach ............. 285/140.1 |
| 4,411,458 A | | 10/1983 | Strunk et al. |
| 4,423,891 A | * | 1/1984 | Menges ....................... 285/331 |
| 4,542,922 A | * | 9/1985 | Grossauer ................... 285/903 |
| 4,747,621 A | * | 5/1988 | Gans et al. ..................... 285/7 |
| 4,775,073 A | | 10/1988 | Webb |
| 4,805,444 A | | 2/1989 | Webb |
| 4,932,257 A | | 6/1990 | Webb |
| 4,971,477 A | | 11/1990 | Webb et al. |
| 5,040,408 A | | 8/1991 | Webb |
| 5,042,844 A | * | 8/1991 | Iida et al. ...................... 285/7 |
| 5,060,509 A | | 10/1991 | Webb |
| 5,098,221 A | | 3/1992 | Osborne |
| 5,129,684 A | * | 7/1992 | Lawrence et al. .......... 285/903 |
| 5,150,928 A | | 9/1992 | Lodder et al. |
| 5,257,652 A | | 11/1993 | Lawrence |
| 5,263,794 A | | 11/1993 | Webb |
| 5,265,652 A | | 11/1993 | Brunella ..................... 141/59 |
| 5,295,760 A | | 3/1994 | Rowe |
| 5,297,896 A | | 3/1994 | Webb |
| 5,333,490 A | | 8/1994 | Webb |
| 5,345,813 A | | 9/1994 | Flessas |
| 5,366,318 A | | 11/1994 | Brancher |
| 5,372,454 A | | 12/1994 | Lawrence |
| 5,398,976 A | | 3/1995 | Webb |
| 5,407,300 A | | 4/1995 | Guindon et al. |
| 5,431,457 A | | 7/1995 | Youngs |
| 5,486,023 A | | 1/1996 | Sanders et al. |
| B15,263,794 A | | 1/1996 | Webb |
| 5,490,419 A | | 2/1996 | Webb |
| 5,494,374 A | | 2/1996 | Youngs et al. |
| 5,497,810 A | | 3/1996 | Berger et al. |
| 5,527,130 A | | 6/1996 | Webb |
| 5,553,971 A | | 9/1996 | Osborne |
| 5,567,083 A | | 10/1996 | Osborne |
| 5,704,656 A | | 1/1998 | Rowe |
| 5,762,108 A | * | 6/1998 | Hunter ....................... 138/190 |
| 5,829,483 A | * | 11/1998 | Tukahara et al. ........... 138/109 |
| 6,079,749 A | * | 6/2000 | Albino et al. ............... 285/903 |
| 6,092,274 A | * | 7/2000 | Foti ........................... 285/903 |

OTHER PUBLICATIONS

Advanced Polymer Technology, Inc., Advanced Flexible Underground Piping System, 1995, Elkhart, Indiana.

Total Containment . . . Pioneering Secondary Containment Systems for Future Generations, PB100 Apr. 1995, Oaks, Pennsylvania.

Total Containment, "Delivering the Difference", 1996, Oaks, Pennsylvania.

Advanced Polymer Technology, Inc., Quick–Set™ Modular Tank Sump System, Publication No. TS201, Aug. 1, 1993.

Advanced Polymer Technology, Inc., Poly–Tech™ Flexible Entry Boots, Publication No. FEB201, Aug. 1, 1993, Elkhart, Indiana.

Advanced Polymer Technology, Inc., Poly–Tech™ Split Dispenser Sumps, PDS201, Aug. 1, 1993, Elkhart, Indiana.

Environ, GeoFlex™ Piping System, Publication No. PM–0402, Feb. 1, 1994, Lionville, Pennsylvania.

Environ, Tank Sump Manual, Publication No. PM–0104, Jul. 1, 1994, Lionville, Pennsylvania.

Total Containment, Dispenser Sumps, Publication No. DS800, Sep. 1, 1994, Oaks, Pennsylvania.

Total Containment, U.S. Price Manual, Publication No. PM1500, Apr. 1, 1995, Oaks, Pennsylvania.

Environ, Dispenser Containment Manual, Publication No. P–DCM–4030, May 15, 1995, Lionville, Pennsylvania.

Total Containment, Multisided Tank Sumps, Publication No. SR200, Jun. 1, 1995, Oaks, Pennsylvania.

Total Containment: Tank Sumps: Fiberglass/Cuffed Polyethylene, Publication No. SR300, Jun. 1, 1995, Oaks, Pennsylvania.

Advanced Polymer Technology, Inc., Poly–Tech™ TS–4230 Standard Burial Tank Sump, Publication No. TS42, Sep. 15, 1995, Elkhart, Indiana.

Environ, Installation Instructions Flexible Entry Boots, Publication No. P–FBI–5070, Mar. 1, 1995, Lionville, Pennsylvania.

Environ, 1998 Product Catalog, Pub. No.: EPC–2010, Feb. 15, 1998, Exton, Pennsylvania.

Total Containment, New Product Bulletin No. 96–02, Pioneering Primary and Secondary Containment Systems, Jan. 15, 1996 Oaks, PA.

Environ, Product Price List, Publication No. P–APB–1010, Aug. 15, 1996, Lionville, PA.

Environ, The GeoFlex System, Publication No. P–APB–2010, Oct. 1, 1996, Lionville, PA.

* cited by examiner

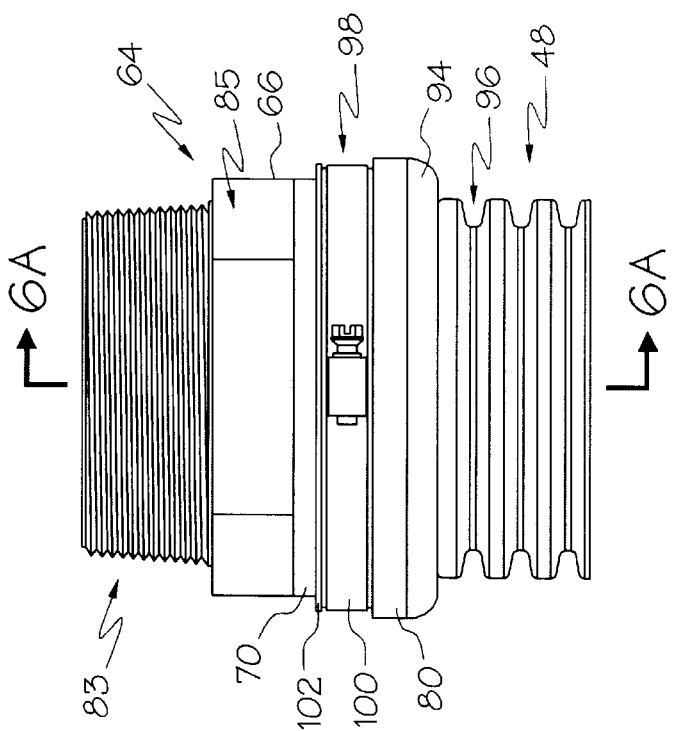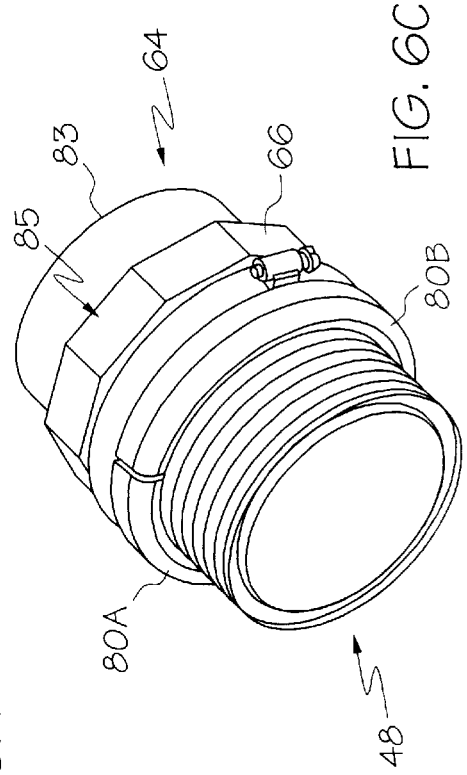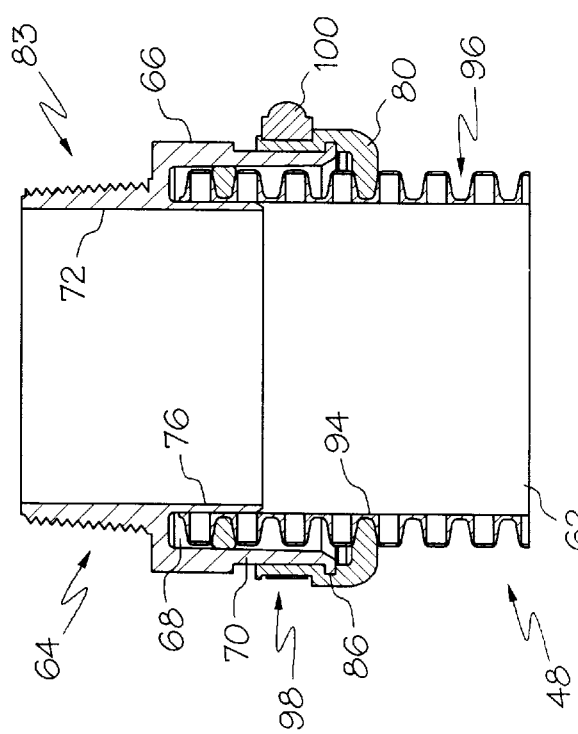

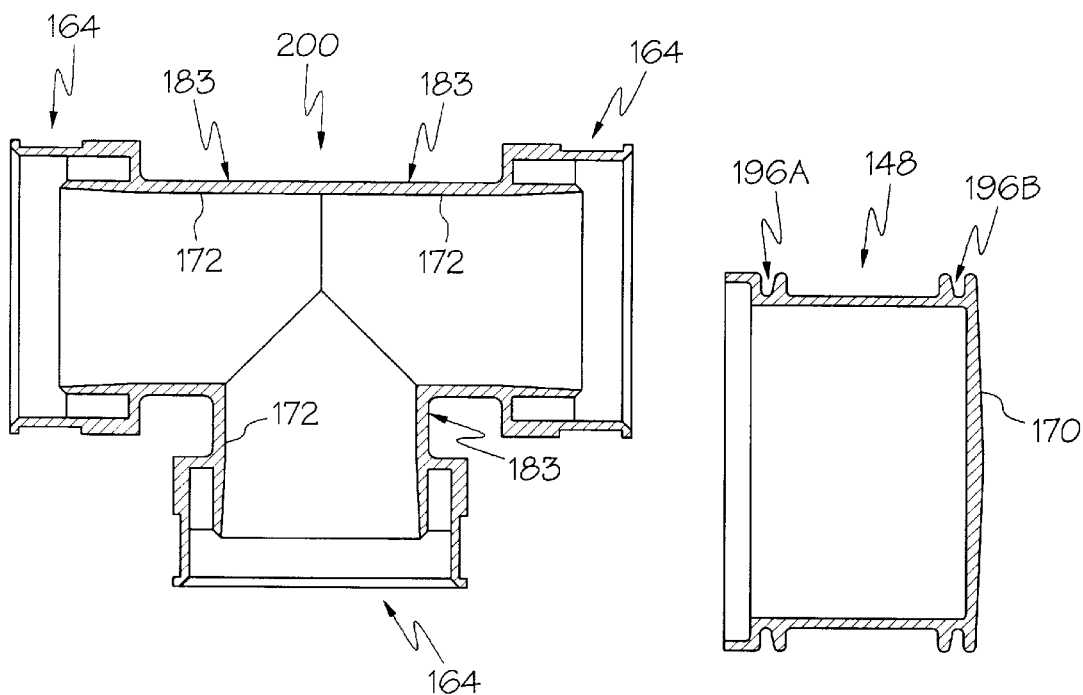
FIG. 10
FIG. 11
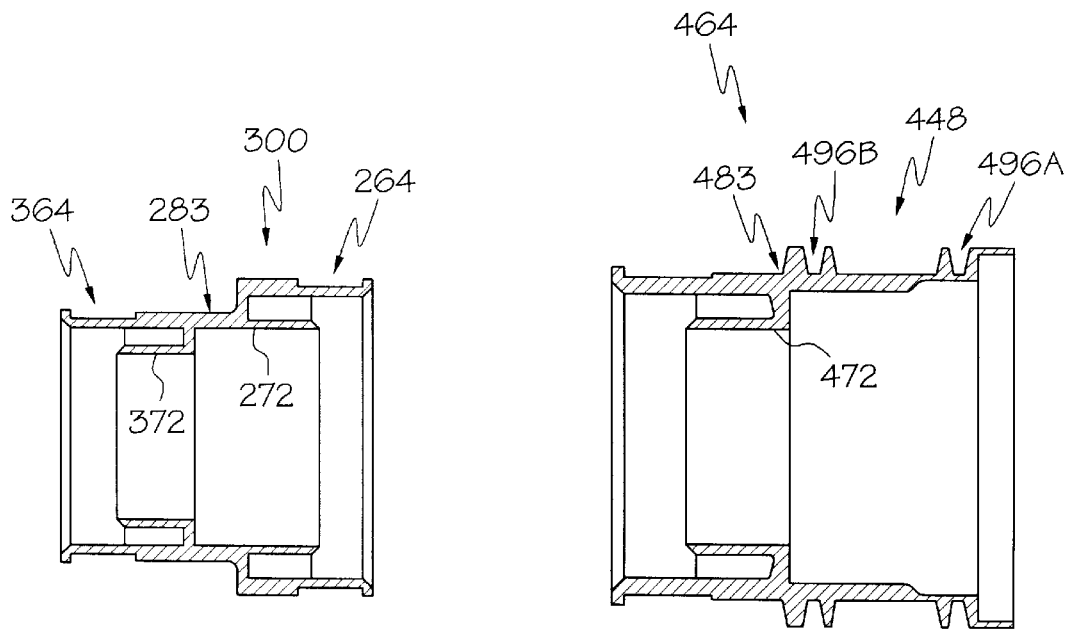
FIG. 12
FIG. 13

APPARATUS AND SYSTEM FOR CONTAINMENT

TECHNICAL FIELD

This invention relates generally to the field of transfer and containment systems and, more particularly, to a vent pipe fitting for use with hydrocarbon fuel piping systems.

BACKGROUND OF THE INVENTION

A substantial number of the leaks in underground storage systems, such as those utilized by hydrocarbon fuel dispensing stations, can be traced to the failure of underground piping systems utilized in the storage systems. These failures often occur at specific locations, such as at fittings (e.g., unions, elbows, couplings, and connections to underground equipment) and at corroded sections of metal pipes. Moreover, structural failures in piping systems sometimes occur when movements take place in tanks and/or piping systems because of high water tables or settling ground movement. This is particularly true in the case of rigid fiberglass piping systems, which are subject to cracking or outright structural failure.

In an effort to remedy these problems, secondarily contained piping systems were developed. Such a system often comprises containment chambers housing the various pieces of equipment. Primary conduit connects the equipment to allow a primary substance, referred to hereinafter as the product, to be communicated therebetween. Furthermore, a secondary conduit or wall (hereinafter generally referred to as "secondary conduit") generally surrounds the primary conduit for containing any of the product that might escape the contained portion of the primary conduit.

According to one application, secondarily-contained piping systems can be utilized to prevent or decrease the inadvertent escape of hazardous fluids, such as hydrocarbon fuel, into the surrounding environment. Moreover, these systems often allow any escapage from the primary conduit into a space between the primary conduit and the secondary conduit to be removed without contaminating the surrounding environment. In some applications, secondarily-contained piping systems can also allow for the replacement of the primary conduit without excavating or breaking ground at the installed underground storage site.

In most applications, couplings are used to connect the respective ports of the various pieces of underground equipment (e.g., pumps, dispensers, etc.) to the ends of the primary conduit. Typically, the ends of the secondary conduit will be open to the containment chamber(s) so that the product can escape into or out of a space between the secondary conduit and the primary conduit from or to the containment chamber. Alternatively, the ends of the secondary conduit can also be sealed to contain any of the product which escapes from the contained portion of the primary conduit.

In some applications, it is also useful to contain and/or distribute a secondary substance associated with the product. For example, additional hazardous fluids, such as hydrocarbon fuel vapors, might be associated with the product. Conventionally, these secondary substances, referred to hereinafter, by example, as vapor, have been contained and/or distributed through separate conduits, referred to hereinafter as vapor lines, which may or may not be contained by the secondary conduit or wall.

Typical vapor lines are inflexible and are formed from rigid materials such as fiberglass and polyvinyl chloride (PVC). As previously mentioned, these vapor lines are often susceptible to cracking and/or outright structural failure. Conventional vapor lines also typically use metal fittings which must be attached to the vapor lines using materials such as epoxy. In cold weather, for example, heat blankets or packs must often be used when joining such a fitting to the vapor line in order to properly cure the bonding and/or sealing materials.

Accordingly, it would be advantageous to provide an improved containment system. In addition, it would be desirable to provide an improved fitting for use in a containment system. Moreover, it would also be advantageous to provide a secondarily contained piping system that is capable of containing and/or distributing secondary substances, without necessarily including a separate conduit.

SUMMARY OF THE INVENTION

It is one object of this invention to provide an improved containment system.

It is another object of this invention to provide an improved fitting for use in a containment system.

Still another object of the present invention is to provide an improved fitting that is inexpensive to produce and easy to install.

It is another object of this invention to provide a secondarily-contained piping system that is capable of containing and/or distributing secondary substances, without necessarily including a separate conduit.

It is still another object of this invention to provide a secondarily-contained hydrocarbon fuel piping system that is capable of containing and/or distributing vapor.

It is yet another object of this invention to provide fittings for use with a secondarily-contained piping system that is capable of containing and/or distributing secondary substances.

According to one embodiment of the present invention, a fitting for conduit comprises a body and an acceptor. The body has a wall and a throughbore. Meanwhile, the acceptor is disposed along the wall and is capable of providing a sealing interface between the throughbore and the conduit.

Preferably, the acceptor comprises a space defined between an interior surface of the wall of the body and a lip connected to the body. More preferably, the lip is a substantially rigid sleeve arranged generally parallel to the interior surface of the wall of the body. In preferred fittings according to this embodiment, an end of the sleeve is chamfered. According to another preferred embodiment of the invention, the lip and body are integrally connected.

In yet another preferred embodiment of the present invention, the fitting further includes a clasp capable of securing a portion of the conduit to the body. Preferably, a first end of the body defines an opening capable of receiving the conduit, and the clasp is capable of securing a portion of the conduit adjacent to the opening to the body. Furthermore, a preferred fitting further includes a protrusion extending from the body, wherein the clasp is adapted to receive the protrusion. In preferred fittings according to this embodiment, the protrusion is disposed on an exterior surface of the wall and is substantially adjacent a first end of the wall.

Preferably, the clasp includes opposing, generally semicircular halves. In embodiments including a clasp, a preferred fitting further includes a fastener for securing the clasp to the body. Moreover, preferred clasps include a first portion adapted to be received in a groove on the conduit.

In a preferred embodiment, the fitting further includes a seal capable of cooperating with the conduit and the acceptor to form the sealing interface. Preferably, the seal is capable of cooperating with a groove on the conduit to form the sealing interface. More preferably, the seal comprises a ring having a generally T-shaped conformation.

According to another preferred embodiment of the present invention, a second end of the body is adapted to cooperate with another fitting. Preferably, the second end of the body is threaded. Alternatively, a second end of the body is connected to a second fitting, the throughbores of the first and second fittings being in fluid communication. In yet another alternative embodiment, a second end of the body is connected to a plurality of fittings, the throughbores of the plurality of fittings being in fluid communication. In addition, a preferred fitting according to the present invention has at least a portion of an external surface of the body adapted to be received by a wrench.

In another embodiment of the present invention, a containment system comprises a conduit, a fitting, and a sealing interface. The conduit has at least one wall and a flow passage. The fitting includes a body and an acceptor. The body has a wall and a throughbore. Meanwhile, the acceptor is disposed along the wall of the body and receives a portion of the at least one wall of the conduit. The sealing interface is between the throughbore and the flow passage.

Preferably, the acceptor comprises a space defined between an interior surface of the wall of the body and a lip connected to the body. More preferably, the lip comprises material having a first coefficient of thermal expansion and the at least one wall of the conduit comprises material having a second coefficient of thermal expansion. The first coefficient of thermal expansion is preferably less than the second coefficient of thermal expansion.

In yet another embodiment of the present invention, a secondary containment system comprises a primary conduit, a secondary conduit, a fitting comprising a body and an acceptor, and a sealing interface. The primary conduit is capable of containing hydrocarbon fuel. The secondary conduit generally surrounds at least a portion of the primary conduit and has a flow passage and a wall with a generally corrugated external surface.

The body of the fitting has a wall and a throughbore capable of allowing the primary conduit and the flow passage to communicate therethrough. The acceptor is disposed along the wall and receives a portion of the wall of the secondary conduit. The sealing interface is between the throughbore and the flow passage.

Preferably, the acceptor comprises a space defined between an interior surface of the wall of the body and a substantially rigid lip connected to the body, wherein the lip comprises a sleeve arranged substantially parallel to the interior surface of the wall of the body. More preferably, a first end of the body defines an opening capable of receiving the secondary conduit. According to this embodiment, the secondary containment system further includes a clasp securing a portion of the secondary conduit adjacent the opening to the body, and a protrusion extending from the body. The clasp receives the protrusion, and a first portion of the clasp is received in a groove on the generally corrugated external surface of the wall of the secondary conduit. Furthermore, a preferred secondary containment system according to this embodiment includes a seal cooperating with a groove on the generally corrugated external surface of the wall of the secondary conduit to form the sealing interface, and the seal comprises a ring having a generally T-shaped conformation.

Still other aspects of the present invention will become apparent to those skilled in this art from the following description wherein there is shown and described various embodiments of this invention, simply by way of illustration. As will be realized, the invention is capable of other different aspects and embodiments without departing from the scope of the invention. Accordingly, the drawings and descriptions should be regarded as illustrative in nature and not as restrictive in nature.

BRIEF DESCRIPTION OF THE DRAWINGS

While the specification concludes with claims particularly pointing out and distinctly claiming the invention, it is believed the same will be better understood from the following description taken in connection with the accompanying drawings in which:

FIGS. 6A–6C are cross-sectional, side and perspective views, respectively, of a fitting and a fitted piece of conduit according to one embodiment of the present invention;

FIGS. 10–13 are cross-sectional side views of various fittings according to other embodiments of the present invention;

DETAILED DESCRIPTION OF THE PREFERRED EMBODIMENTS

Figure 1:
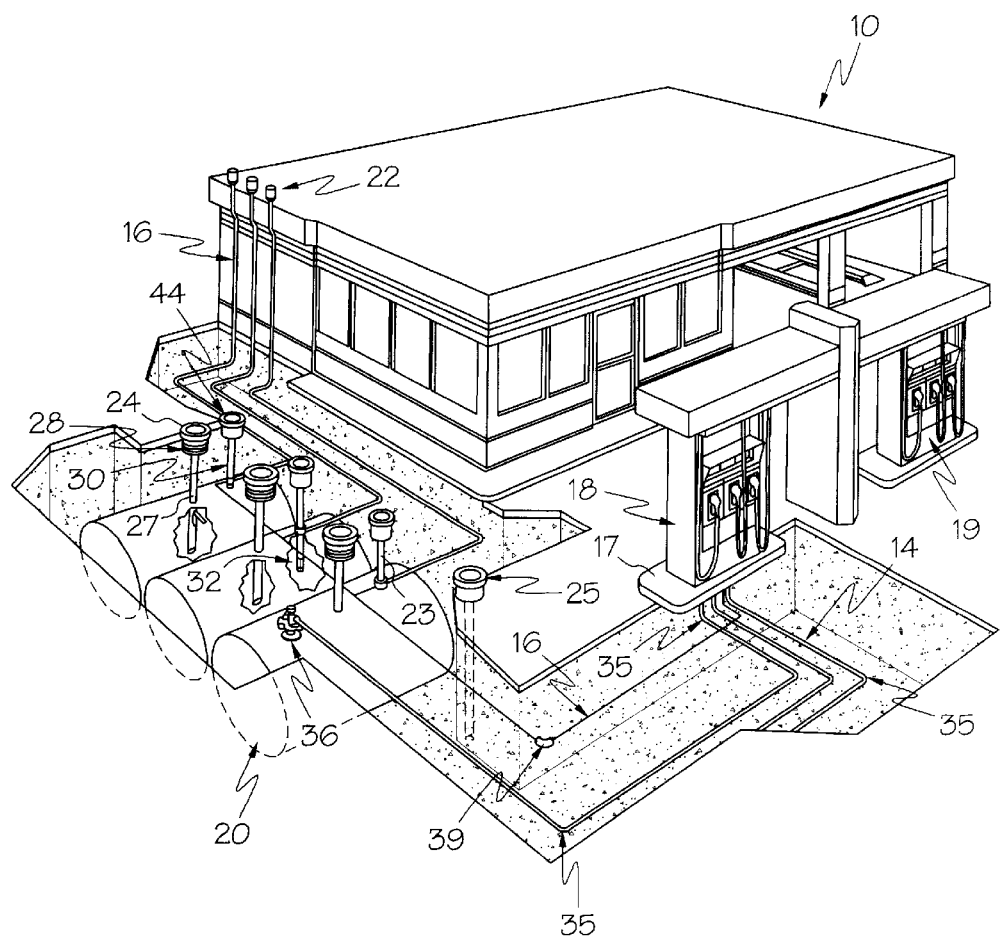
FIG. 1 is a partial cross-sectional view of a conventional fuel dispensing system.

Referring now to the drawings in detail, wherein like numerals indicate the same elements throughout the views, FIG. 1 depicts a typical hydrocarbon fuel dispensing station 10. Underground storage tanks ("USTs") 20 are filled with product (e.g., fuel) by opening a manway 24 and transferring the product to at least one of the USTs 20 through a fill pipe 27. A pump, such as the submersible pump 36 depicted, can then be utilized to transfer the product from one of the USTs 20, through the product line 14, to the product dispensers 18, 19, which may be conventional service station gas pumps.

Many conventional dispensing stations, such as the one depicted, feature byproduct (e.g., vapor) recovery systems. Typically, such systems are used to help prevent byproducts (referred to hereinafter, by example, as vapors) such as fuel vapors, and more particularly hydrocarbon vapors, from escaping into the atmosphere when a transport drop is made into a UST 20 and/or when the product is dispensed. The illustrated dispensing station 10 features a balanced, closed loop system designed to prevent such an escape in both instances.

Generally, transport vapor recovery systems incorporate a vapor return path from the fill nozzle (that is discharging the product into the UST 20) to the delivery transport (e.g., a fuel dispensing vehicle) from which the product is being discharged. Similarly, dispensing vapor recovery systems incorporate a vapor return path from the dispensing nozzle that is discharging the product into the container (e.g., a vehicle fuel tank) to the UST 20 from which the product is being drawn. The vapor can thus be returned to the delivery transport or UST 20 rather than being released (e.g., into the atmosphere).

Figure 2:
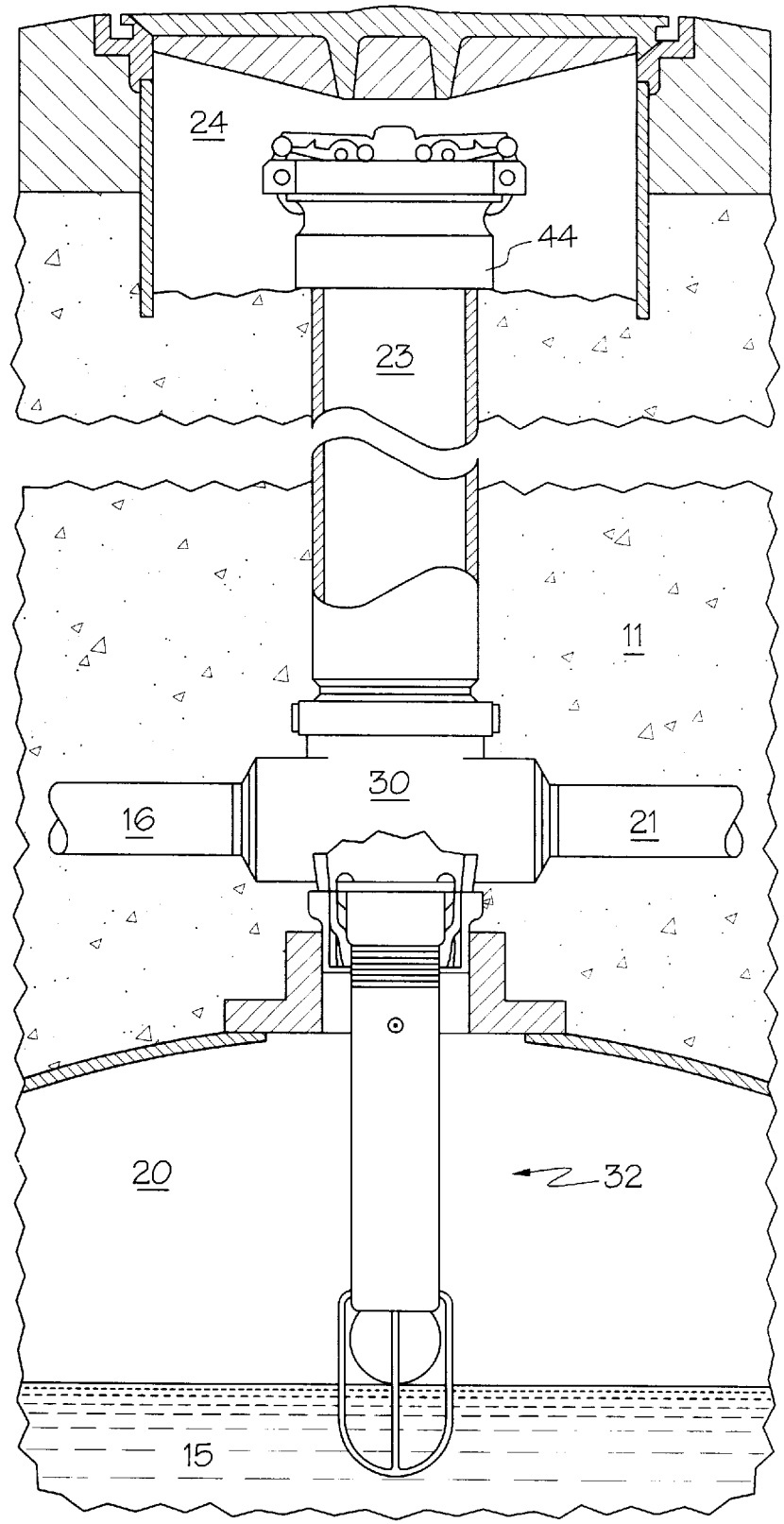
FIG. 2 is a partial cross-sectional view of a conventional vapor recovery system for use in a fuel dispensing system.

Referring now to FIG. 2, a dispensing station featuring a transport vapor recovery system typically features a return pipe 23 rising from the UST 20 to a return fitting 44 that can accept a return nozzle (not shown) from the delivery transport. In some applications, the return nozzle can be coaxial with the fill nozzle. In such an application, a coaxial fill pipe (not shown) can be utilized in lieu of a separate return pipe 23.

Preferably, the transport vapor recovery system also utilizes a vent valve 32 in the USTs 20. Vent valves 32 are used to help prevent overfilling the USTs 20 and/or product mixing. Moreover, extractor fittings 30 can also be used to connect the vent valves to the return pipe 23, so that, for example, the vent valves can be removed from the USTs without requiring substantial excavation.

Meanwhile, in a dispensing vapor recovery system, a dispensing nozzle having vapor recovery capability has both product and vapor passages within its nozzle body, and is connected to the respective dispenser 18 by a hose that also includes both product and vapor passages. As can be understood by one of ordinary skill in the art, the fuel and vapor passages of the hose can be placed in fluid communication with a product line 14 and a vapor line 16, respectively. Although each nozzle can be associated with a separate vapor line 16, the vapor passages of each nozzle associated with a particular dispenser are preferably manifolded together into a single vapor line.

According to one embodiment of the present invention, the vapor line 16 is placed in fluid communication with at least one of the USTs 20, allowing vapor to be placed in the UST when, for example, product is being dispensed. Vapor lines 16 for each dispenser 18, 19 can be individually communicated to the respective UST 20, or can be manifolded together and communicated to one or more USTs. Generally, to place the vapor line 16 in fluid communication with a fuel passage of a hose, one of the USTs 20, another vapor line, or any other device or piece of equipment, a fitting must be used to couple the vapor line to the respective location.

Vapor vents 22 are used to help maintain pressure in the USTs 20. Preferably, vent lines 21 are used to place the vapor vents in fluid communication with the USTs 20. Although the vent lines 21 shown in FIG. 1 individually rise from each UST 20, they can also be manifolded (either above or below ground). Furthermore, as with vapor lines 16, vent lines also typically utilize fittings to fluidly communicate with the desired location.

Figure 4:
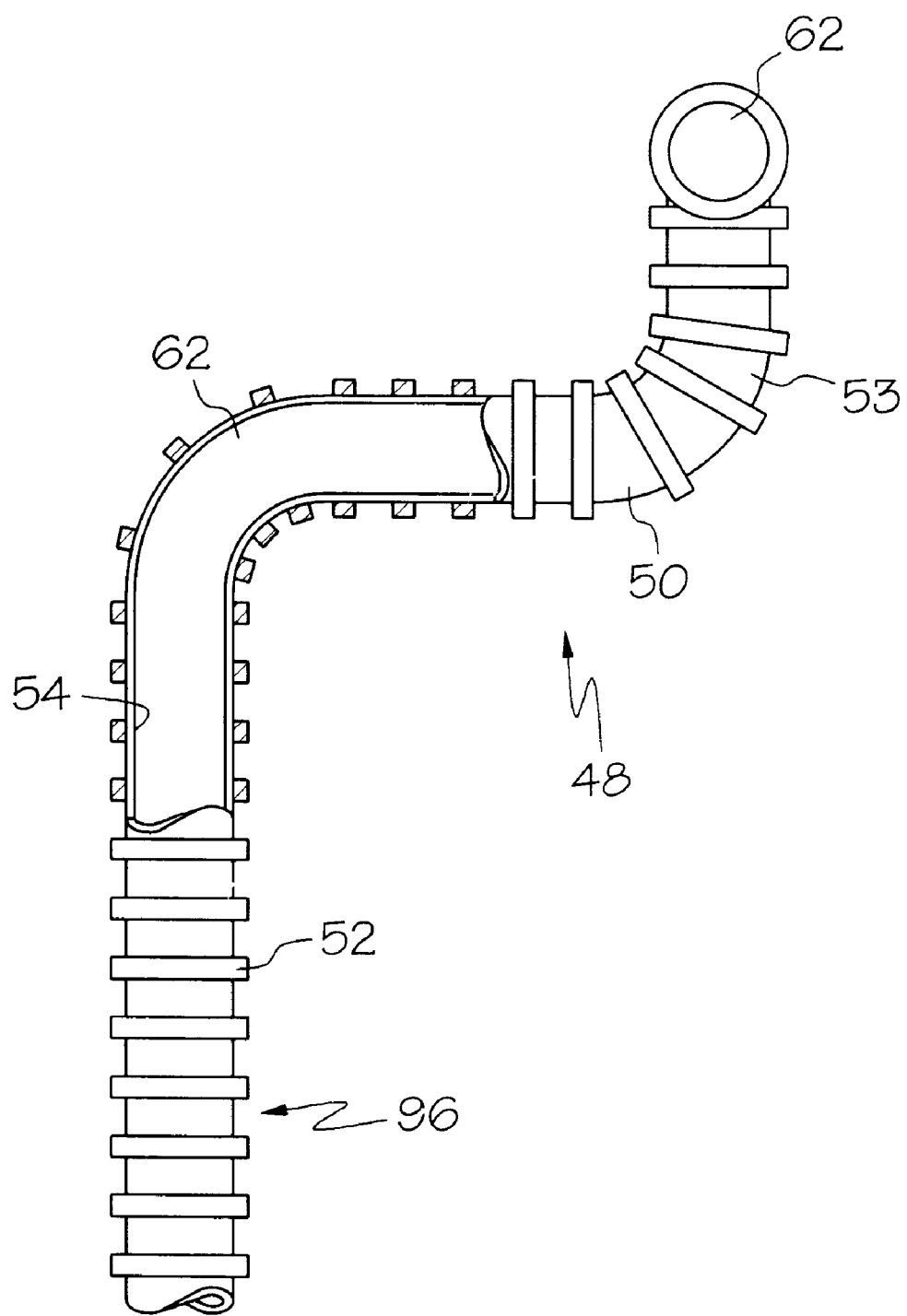
FIG. 4 is a partial cross-sectional view of conduit according to one embodiment of the present invention.

Referring now to FIG. 4, both the vapor lines 16 and vent lines 21 can be formed from conduit 48 comprising at least one wall 52 and a flow passage 62. At least one of the walls 52 is preferably substantially impervious to fluids. At least one of the walls 52 should also preferably be crush and puncture resistant. Moreover, the conduit 48 can also be flexible. Using flexible conduit can, for example, improve the reaction of the conduit 48 to mechanical forces, such as ground movement and pump surges, and allow the conduit to be bent around corners, thereby reducing the number of joints in the system.

Preferably, at least a section of an exterior surface 50 of the conduit 48 is corrugated. For example, the at least one wall 52 can include exterior and interior layers 53 and 54. While the exterior layer 53 preferably comprises the corrugated exterior surface 50, the interior layer 54 can comprise an at least semi-smooth liner. Providing such an interior layer 54 can, for example, improve the flow of any contained vapor. Although the at least one wall 52 of the conduit 48 can be formed from a variety of materials, it is preferably formed from materials such as polyethylene, fluoro-polymers, nylon and the like.

According to one embodiment of the present invention, an improved fitting for use with conduit 48 is provided. As shown in the embodiment depicted in FIGS. 5A–5D, the fitting 64 comprises a body 66 and an acceptor 68. The body 66 has a wall 70 and a throughbore 72.

In a preferred embodiment, a first end 82 of the body 66, such as the first end of wall 70 for example, defines an opening 84 capable of receiving an end portion of the conduit 48. Meanwhile, the second end 83 of the body 66 can be adapted to cooperate with another fitting. For example, the second end 83 of the body 66 can be threaded, such as for reception in/receiving another fitting, such as an extractor fitting 30 or the outlet of a shear valve (not shown), for example. Furthermore, at least a portion of an external surface 85 of the body 66 can be adapted to be received by a wrench, thereby easing installation of the preferred fitting in a cooperating fitting.

Preferably, the second end 83 of the body 66 comprises material having approximately the same coefficient of thermal expansion as that of the material of which the cooperating fitting is comprised. More preferably, the material of which the second end 83 of the body 66 is comprised should also be impact-resistant, dimensionally stable, and corrosion-resistant. One advantage of using material having, for example, a coefficient of linear thermal expansion generally matching that of the material of which the cooperating fitting is comprised, can be a reduced risk of leaking at the interface between the two fittings (e.g., by helping both fittings expand and contract together with temperature changes), particularly at low ambient temperatures. For example, when the fitting 64 is adapted to cooperate with a cast iron fitting (about 0.0000059 inch/inch* ° F.), the second end 83 is preferably formed from a material which has a relatively low coefficient of linear thermal expansion, such as, for example, an aliphatic polyketone (such as Carilon®, manufactured by the Shell Chemical Co. of Houston, Tex., a company of the Royal Dutch/Shell Group of The Hague, Netherlands (about 0.0001 inch/inch* ° C.)) or, more preferably, a high-fill, fiber-reinforced nylon (such as Esbrid®, manufactured by Thermofil, Inc. of Brighton, Mich. (about 0.00001 inch/inch* ° F.)).

The acceptor 68 is preferably disposed along the wall 70 and is capable of providing a sealing interface between the throughbore 72 and the flow passage 62 of a fitted section of conduit 48. Preferably, the acceptor 68 comprises a material having a coefficient of thermal expansion no greater than that of the conduit 48. According to one embodiment, providing an acceptor 68 having a coefficient of linear thermal expansion less than that of the conduit 48, for example, can help protect the integrity of a sealing interface between the throughbore 72 and the flow passage 62 of a fitted section of conduit 48 during low ambient temperatures, by preventing the conduit from shrinking away from the surface (e.g., interior surface 74) to which the conduit is sealed.

In embodiments where the conduit 48 has a coefficient of thermal expansion higher than that of the second end 83 of the body 66 of a fitting 64 to which it will be fitted, the acceptor 68 preferably comprises the same material as the second end of the body. For example, an embodiment of a fitting 64 meant to be used with conduit 48 having polyethylene walls and cooperating iron fittings, preferably includes an acceptor 68 and second end 83 comprising material, such as the aforementioned high fill, fiber-reinforced nylon material, having a coefficient of thermal expansion less than that of the polyethylene walls.

As is shown in the illustrated embodiment, the acceptor 68 can comprise a lip 76, preferably connected to the body 66, which cooperates with an interior surface 74 of the wall 70 of the body to define a space into which the walls of an end portion of a piece of conduit 48 can be sealing received. Although the lip 76 is preferably integral and symmetrical, it can vary from this construction. Preferably, the lip 76 comprises a sleeve arranged substantially parallel to the interior surface of the wall 70 of the body 66.

In further preferred embodiments, the lip 76 and body 66 are integrally connected. According to one embodiment, the lip 76 is substantially rigid. Moreover, an end 78 of the lip 76 can be chamfered.

Chamfering an end 78 of the lip 76 can, for example, facilitate the reception of an end portion of the conduit 48 with the acceptor 68. Similarly, the interior surface 90 of the first end of the wall 70 can also be chamfered. Chamfering the interior surface 90 can, for example, ease the reception of an end portion of the conduit 48 with the fitting 64.

Referring now to FIGS. 6A–6C, 7 and 8, the fitting 64 can also include a clasp 80. The clasp 80 is capable of securing a portion of the conduit 48 to the body 66. Preferably, the clasp 80 secures the relevant portion of the conduit 48 to the body 66 without crushing it. Moreover, the clasp 80 is preferably formed from a material having substantially the same coefficient of expansion as the material forming the body 66.

According to one embodiment of the present invention, the clasp 80 can include a first portion 94 that is adapted to be received in a groove 96 on the conduit 48, such as one provided on a generally corrugated external surface 50 of the wall(s) of the conduit. Meanwhile, a second portion 98 of the clasp can be adapted to be secured to the body 66. For example, the first and second portions 94, 98, and the respective corresponding areas on the conduit 48 and body 66, can utilize "lip" and "groove" constructions, as illustrated in the embodiment shown in the Figures.

A fastener, such as a marine grade stainless steel band clamp 100, for example, can be installed around the clasp 80, such as around the second portion 98, for example, to help secure the clasp to the body 66. According to this embodiment, the second portion 98 of the clasp 80 preferably includes stops 102 for limiting the axial movement of the clamp 100 along the clasp.

In some instances, movement of a fitted piece of conduit 48, such as when the conduit is bent around tight corners, can place a load on the fitting 64 in the area of the acceptor 68. One effect of such loading may be to stress and/or strain a sealing interface between the throughbore 72 and a communicated flow passage 62. Utilizing a clasp 80 is believed to move this load away from the acceptor 68, thereby reducing potential stresses and strains on any existing sealing interfaces. Moreover, although any portion of the conduit 48 can be secured by the clasp 80, a portion of the conduit adjacent the opening 84 is preferably secured.

A protrusion, such as lip 86, can extend from the body 66, such as from an exterior surface 88 of the wall 70 of the body. In such an embodiment, the clasp 80 can be adapted to receive the protrusion 86. For example, the clasp 80 can include a slot 92 adapted to matingly receive the protrusion 86. Preferably, the protrusion 86 is disposed substantially adjacent the first end of the wall 70 of the body 66. The cooperation between the clasp 80 and the protrusion 86 can, for example, help prevent or reduce axial movement of an installed clasp along the body 66.

Although the clasp 80 can be formed as a single body or a plurality of bodies, such as a plurality of discrete latches, it is preferably formed from opposing halves 80A, 80B. For example, the halves 80A, 80B can each be generally semicircular in shape. Preferably, in an installed position, the halves 80A, 80B cooperate to substantially encircle the body 66 and the fitted piece of conduit 48.

A seal 104 can be used to form the sealing interface between the throughbore 72 and the flow passage 62 of a fitted piece of conduit 48. The seal 104 can be formed from a variety of materials, such as rubber, silicone, and elastomers, although a seal formed from nitrile rubber is preferred. According to one embodiment of the present invention, the seal 104 cooperates with wall(s) of the conduit 48 and the acceptor 68 to form the sealing interface. In a further preferred form, the seal 104 also cooperates with a groove 96 on the conduit 48, such as one provided on an external surface 50 of the wall(s) of the conduit, to form the sealing interface.

Figure 9:
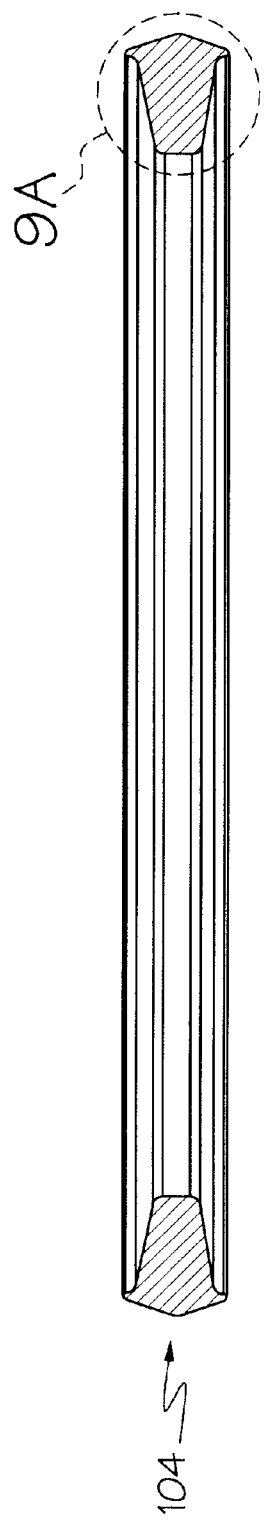
FIG. 9 is a partial cross-sectional side view of a seal according to one embodiment of the present invention.
Figure 9A:
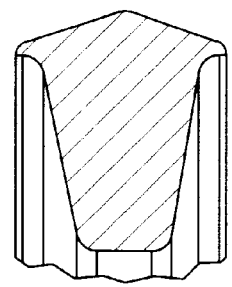
FIG. 9A is an enlarged cross-section of the seal shown in FIG. 9.

As shown in FIGS. 9 and 9A, the seal 104 preferably comprises a ring having a generally T-shaped conformation. According to this embodiment, the seal 104 is adapted to be received in a groove 96 on the conduit 48. When received in a groove 96, the portion of the conduit 48 including the seal 104 can be placed in the acceptor 68, whereby the acceptor and conduit can cooperate to provide a sealing force on the seal and thereby provide the sealing interface.

Figure 14:
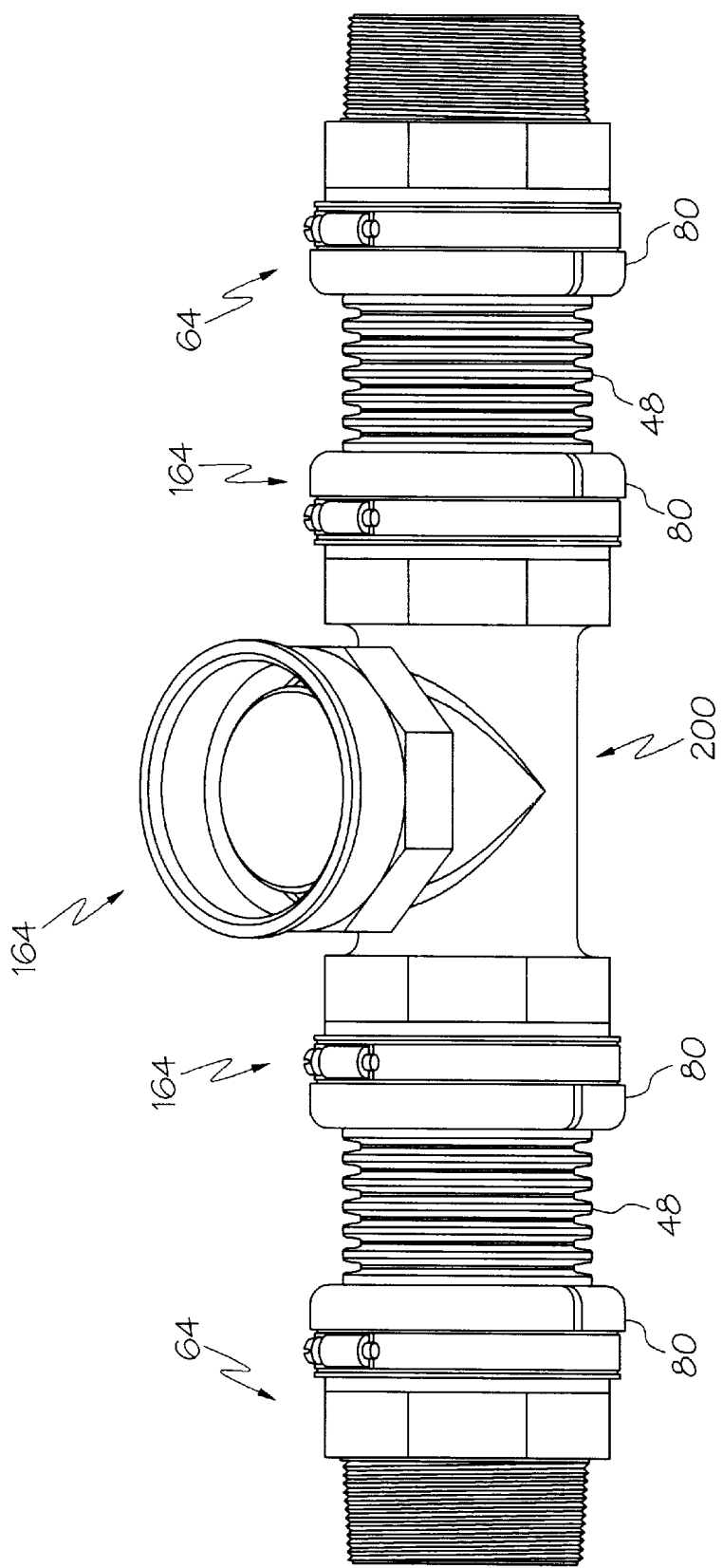
FIG. 14 is a perspective view of an exemplary use of various fittings according to the present invention.

FIGS. 10–15 show various additional embodiments of fittings according to the present invention. As shown in FIGS. 10 and 14, the second end 183 of the fitting 164 can also be connected to additional similar fittings and/or a second conduit. When the throughbores 172 of the fittings 164 are in fluid communication, a connection, such as the T-connection 200 shown in the FIGS. 10 and 14, can be formed. A T-connection 200 could, for example, be used anywhere a branch of the conduit 48 needs to be made, such as when various vapor lines 16 or vent lines 21 need to be manifolded, as can be understood by one of ordinary skill in the art.

Figure 15:
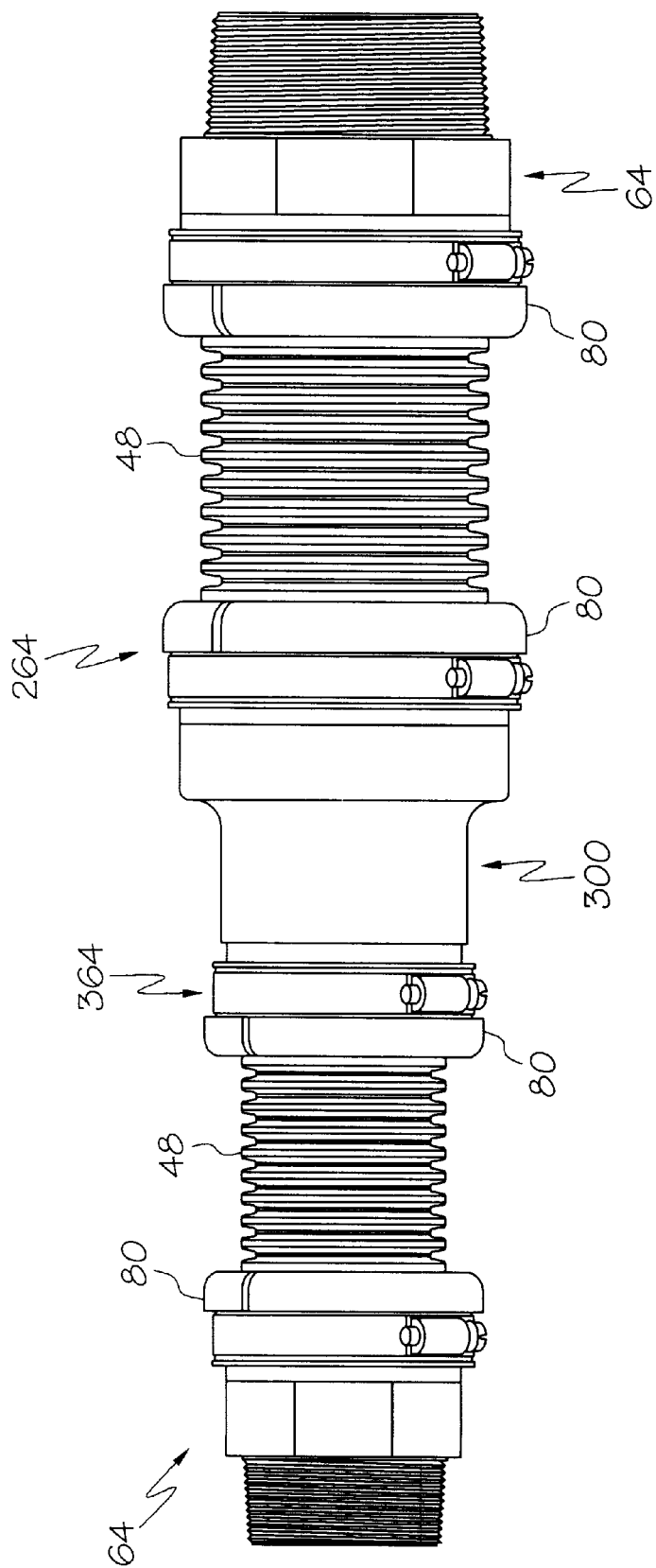
FIG. 15 is a perspective view of an exemplary use of various fittings according to another embodiment of the present invention.

As depicted in FIGS. 12 and 15, the second end 283 of a fitting 264 can also be connected to fittings 364 which correspond to different sizes of conduit 48. When the throughbores 272, 372 of the fittings 264, 364 are in fluid communication, a connection such as the conduit-to-conduit adaptor 300 shown in FIGS. 12 and 15, can be formed. A conduit-to-conduit adaptor 300 could, for example, be useful when connecting two different sizes of conduit 48.

In some instances, it may be necessary for a connection, such as T-connection 200, to fit a different size of conduit 48. Accordingly, it may be advantageous to connect an interconnect 448 to the second end 483 of a fitting 464. According to one embodiment of the present invention, the interconnect 448 is capable of providing a sealing interface between the throughbore 472 of the fitting 464 and the throughbore of a connected fitting.

Preferably, at least a portion of the interconnect 448 is capable of being received with the acceptor of a connected fitting. For example, a portion of the interconnect 448 can be provided with a groove 496A capable of receiving a seal, such as seal 104, wherein the interconnect 448, the seal, and the acceptor of the connected fitting can cooperate to form the sealing interface between the throughbores. According to another embodiment of the present invention, a portion of the interconnect 448 is also adapted to be secured to the body of the connected fitting, such as by clasp 80. For example, a portion of the interconnect 448 can be provided with a groove 496B capable of receiving the first portion 94 of the clasp 80.

Referring now to FIG. 11, a plug 148 can also be formed for use with the fitting of the present invention. According to a preferred embodiment of the present invention, the plug 148 is utilized to seal an unused fitting. The plug 148 can be particularly useful when, for example, a fitting on a connection, such as T-connection 200, is not being used. Preferably, the plug 148 includes a restrictor 170 which is substantially impervious to fluids. When installed in a fitting, the plug 148 according to this embodiment provides a sealing interface between the restrictor 170 and the throughbore of the connected fitting.

Preferably, a portion of the plug 148 is adapted to be received with the acceptor of the connected fitting. For example, the restrictor 170 can be provided with a groove 196A capable of receiving a seal, such as seal 104, wherein the restrictor 170, acceptor, and seal 104 can cooperate to form a sealing interface between the restrictor and the throughbore of the fitting. According to another embodiment of the present invention, a portion of the plug 148 is also adapted to be secured to the body of a connected fitting, such as by clasp 80. For example, the restrictor 170 can be provided with a groove 196B capable of receiving the first portion 94 of the clasp 80.

Figure 16:
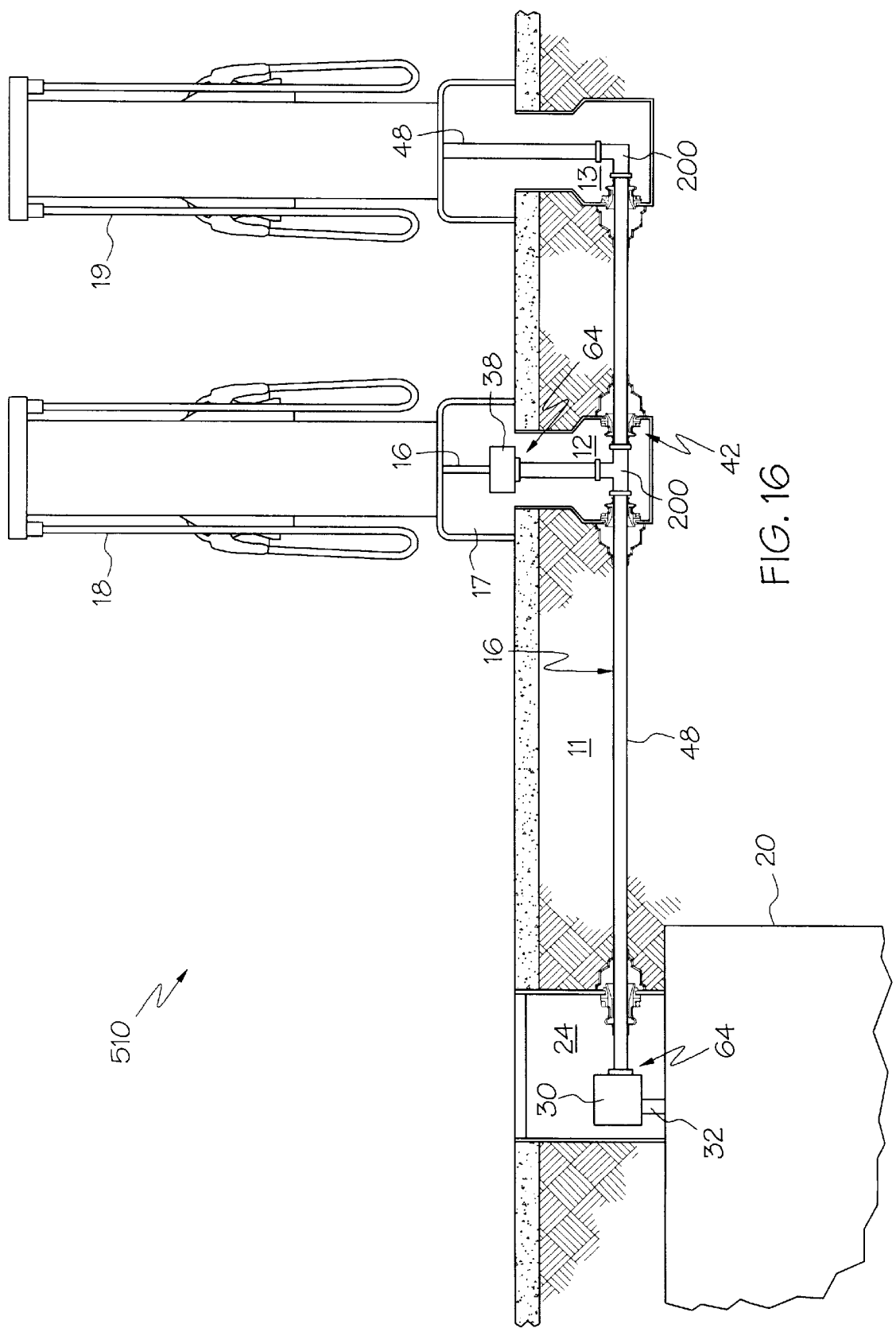
FIG. 16 is an elevational cross-section of an installed underground fuel storage tank provided with a piping system in accordance with one embodiment of the present invention.

Referring now to FIG. 16, a fuel dispensing station 510 utilizing an embodiment of the present invention is illustrated. A vapor line 16 comprising conduit 48 is placed in fluid communication with the vapor passage(s) (not shown) of the vapor recovery nozzle(s) associated with dispensers 18, 19. Although the respective vapor passages can be placed in communication with the flow passage 62 of the conduit 48 at a variety of locations, such as within the dispenser itself, between the dispenser and any included vapor shutoff valves, or at a point downline of any included shutoff valves, a fitting 64 is preferably received in the outlet of a vapor shear valve 38, where the inlet of the vapor shear valve is fitted with a conventional vapor line.

The flow passage 62 of a section of conduit 48 fitted to shear valve 38 can be placed in respective fluid communication with other sections of conduit through connections 200, such as T-connections and elbows, or through adaptors (not shown), for example. Although these connections or adaptions are preferably made within an access or containment chamber, such as dispenser sumps 12, 13, they can also be direct-buried. As can be understood by those of ordinary skill in the art, entry fittings 42 are preferably utilized where conduit 48 enters/exits chambers in order to maintain containment. Entry fittings 42 can provide a sealing interface between the exterior 50 of the conduit 48 and the walls of the chamber.

Eventually, the flow passages 62 of the conduit 48 are placed in fluid communication with at least one of the USTs 20. For example, a section of conduit 48 whose flow passage 62 is in fluid communication with a vapor recovery passage of a nozzle can be fitted, by way of the present invention, to an extraction fitting 30 which is in fluid communication with a UST 20, preferably by way of a vent valve 32. Similarly, the present invention can also be utilized with any vent lines associated with the vapor recovery system.

The present invention ensures sound containment and is relatively easy to install. Preferred embodiments of the present invention, such as those involving the use of flexible conduit with the preferred fitting, for example, further ease installation and can also reduce the containment system's susceptibility to mechanical forces such as ground movement. Moreover, the components associated with the present invention are relatively inexpensive, easy to produce, and easy to install.

Referring back to FIG. 1, containment chambers, such as dispenser sumps (not shown) and spill containers 28, are preferably utilized to surround locations where it is necessary to provide product lines 14 and fill pipes 27 with fittings, such as adaptors (not shown), elbows 35, extractor fittings (not shown), pumps 36, and shutoff valves (not shown). Containment chambers can also provide access to components, such as the various pieces of equipment and lines placed beneath the surface of the pavement. Beyond providing access, containment chambers can also contain product leakage and/or spillage, and prevent or reduce the likelihood that any product might escape into the backfill 11. Additionally, the containment chambers prevent substances, such as groundwater, from entering the access chambers.

Figure 3:
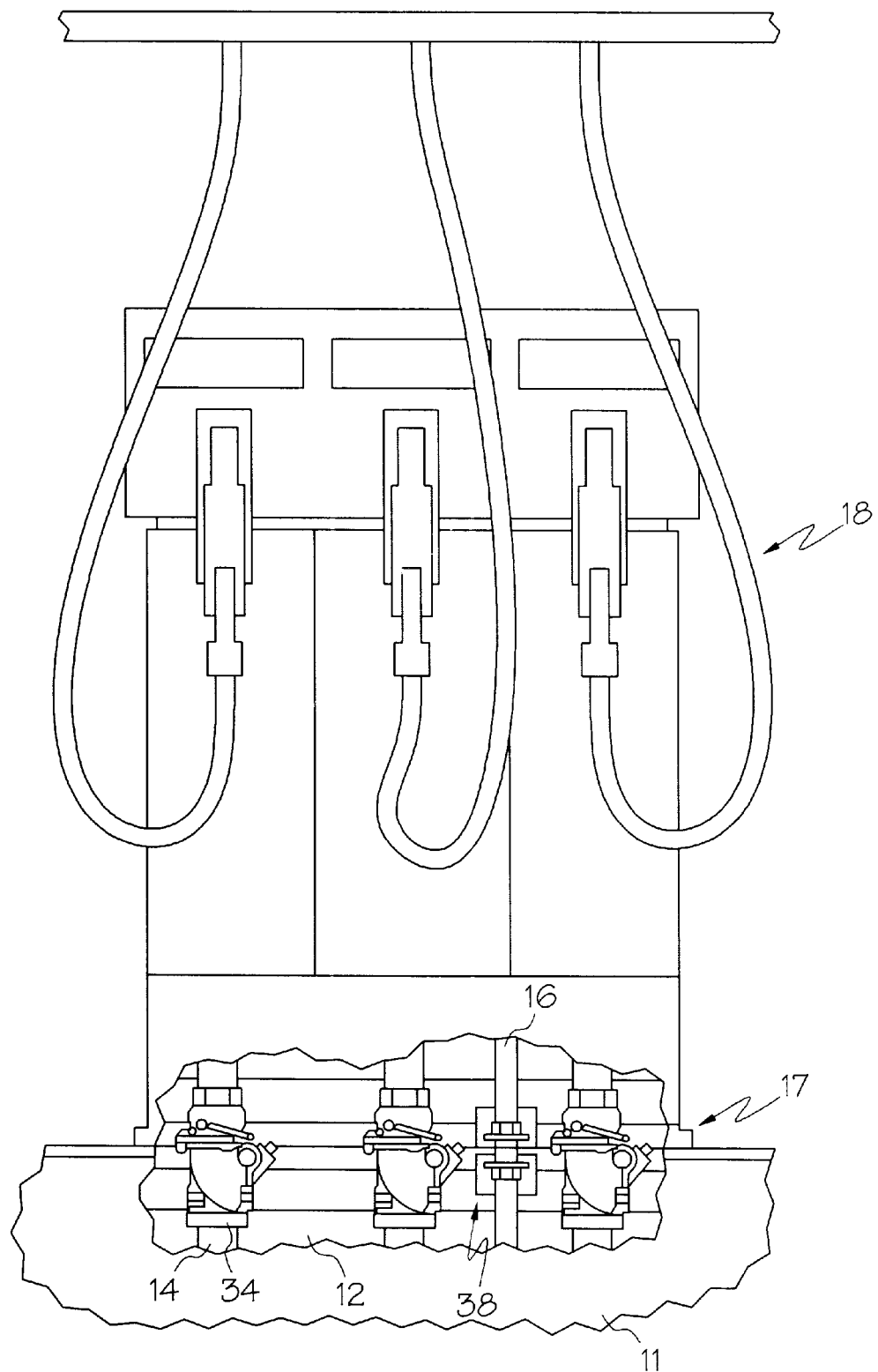
FIG. 3 is a partial cross-sectional view of a conventional dispenser for use in a fuel dispensing system.

As shown in FIG. 3, dispenser sumps 12 typically rise through an island 17 and open to the inside of the dispenser 18, with the lower half of the dispenser sump being surrounded by backfill 11. Dispenser sumps 12 can, for example, provide access to and containment for product shutoff valves 34 and vapor shutoff valves 38. Access is provided to the interior of the dispenser sump 12 through doors (not shown) in the dispenser 18, or by removing the dispenser from the island 17.

The walls of containment chambers are preferably waterproof and resistant to the product (e.g., hydrocarbon fluids), and can be made from materials such as plastic, metal, fiberglass, and the like. Although the depicted dispenser sump 12 is generally pear-shaped, containment chambers can take on a plurality of other shapes. For instance, shallow rectangular sumps, sometimes referred to as dispenser pans, can also be used as containment chambers.

Figure 4A:
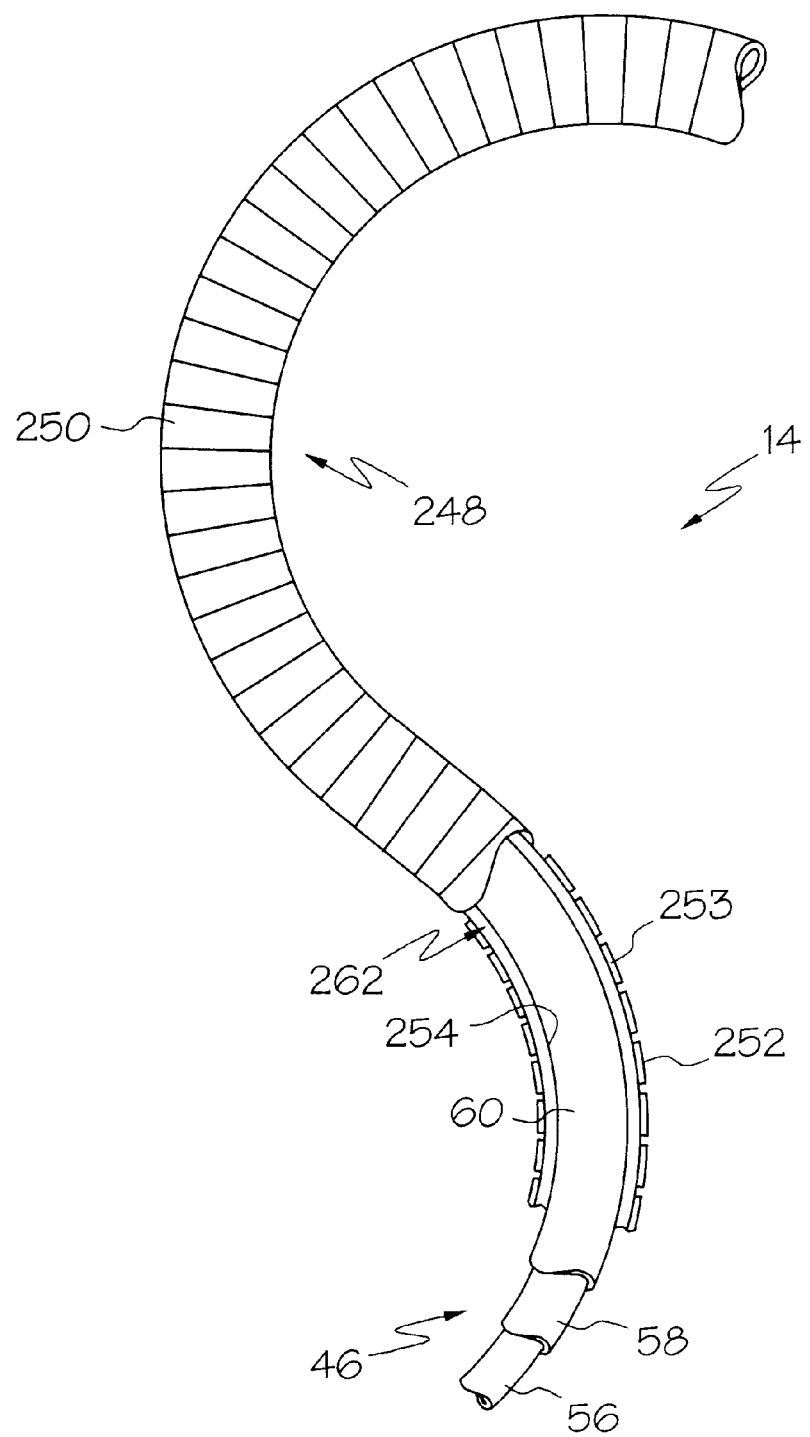
FIG. 4A is a partial cross-sectional view of a product line for use in a fuel dispensing system according to the present invention.
Figure 5A:
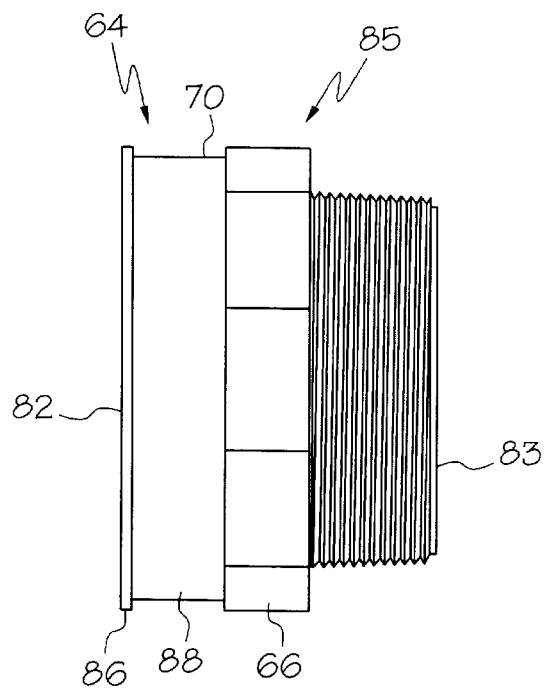
FIGS. 5A–5D are side, bottom, cross-sectional and perspective views, respectively, of a fitting according to the present invention.
Figure 5B:
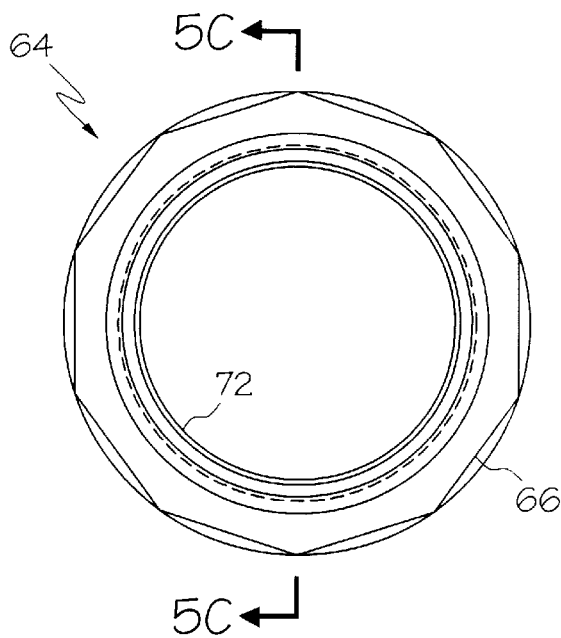
Figure 5D:
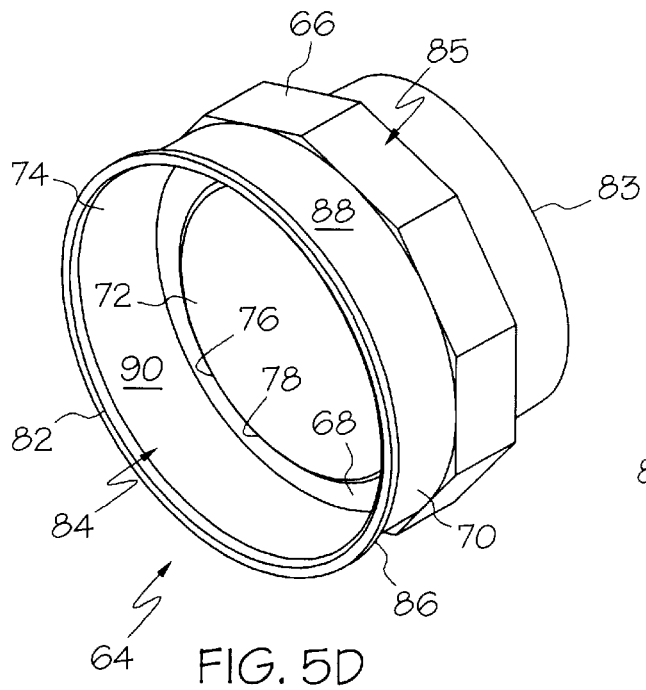
Figure 5C:
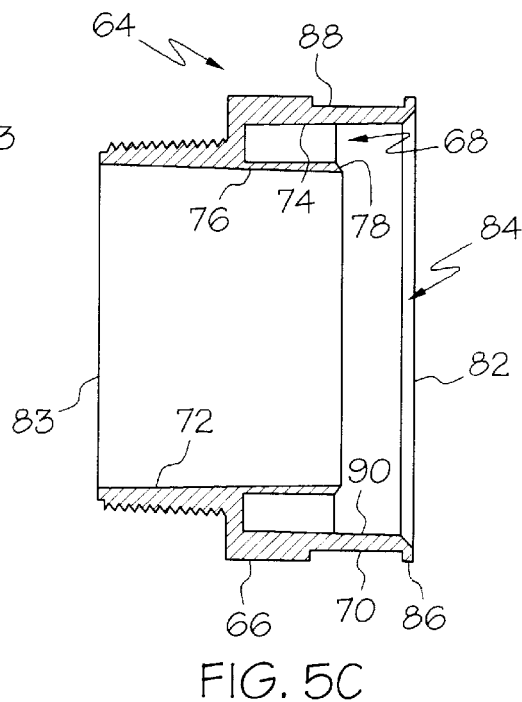
Figure 7:
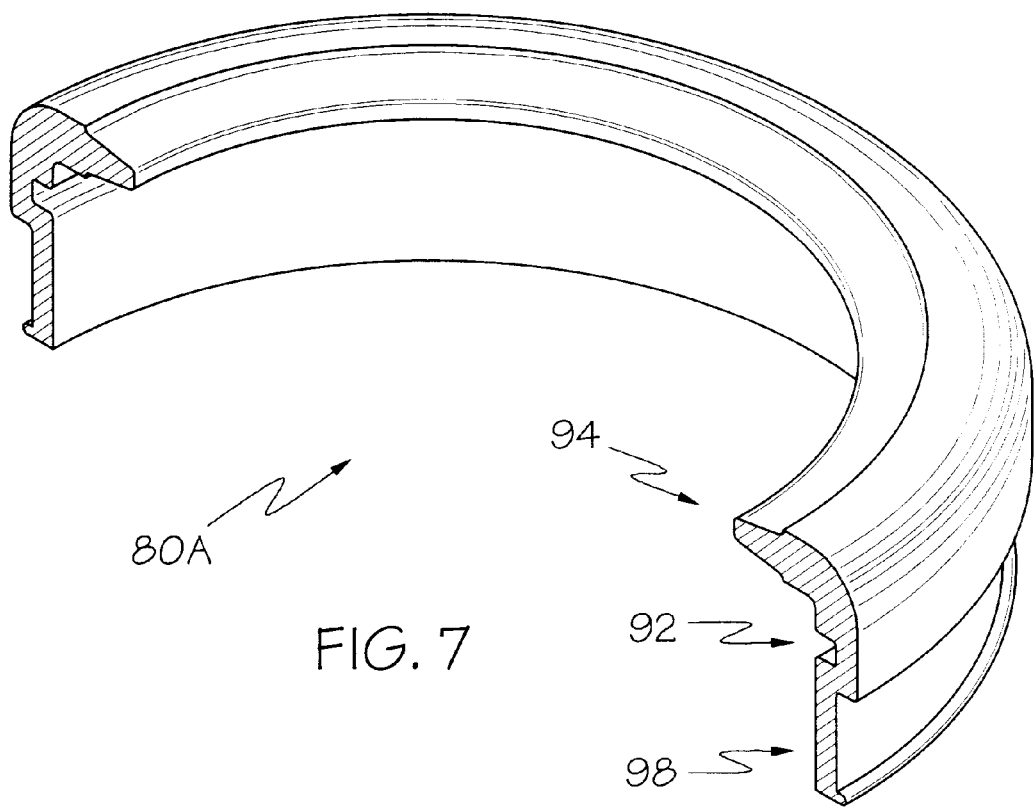
FIG. 7 is a perspective view of a portion of a clasp according to one embodiment of the present invention.
Figure 8:
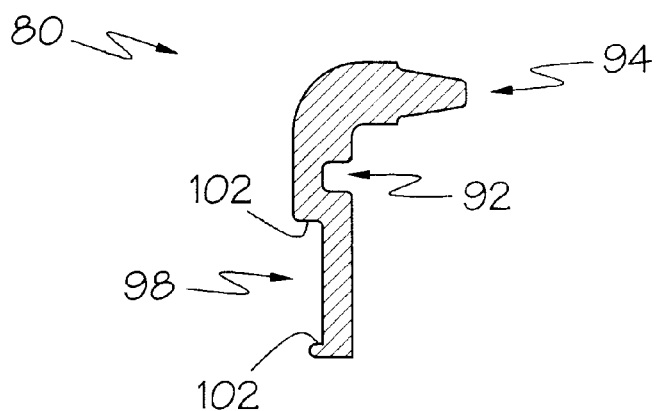
FIG. 8 is a cross-sectional side view of the clasp shown in FIG. 7.

As illustrated in FIG. 4A, the product line 14 generally comprises a primary conduit 46 (referred to hereinafter, by example, as primary pipe) and a secondary wall 248 (referred to hereinafter, by example, as secondary conduit) generally surrounding at least a portion of the primary pipe. Generally surrounding the respective portion of the primary pipe 46 in this manner can help protect the primary pipe against potential problems related to the installation environment. For example, the secondary conduit 248 can help protect the primary pipe from being damaged by backfill 11. In other applications, providing the secondary conduit 248 can, for example, improve the reaction of the primary pipe 46 to mechanical forces such as ground movement and pump surges, allow access to the primary pipe without requiring excavation, and/or help reduce or prevent the escape of product from the primary pipe into the installation environment.

The primary pipe 46 is preferably flexible. The primary pipe 46 also preferably comprises a core 56 that is chemical and permeation resistant. Moreover, the core 56 preferably has a generally smooth bore, allowing for efficient flow capabilities, for example.

In yet a further preferred embodiment, the primary pipe 46 should also have an outer shell 58. The outer shell 58 can provide added protection by, for example, providing a secondary non-permeable layer. The outer shell 58 can also provide reinforcement for the core 56. Preferably, the outer shell 58 is formed from a corrosion resistant material, such as nylon, for example, to help protect the core 56 from microbial attack and corrosive soil conditions.

The secondary conduit 248 can comprise at least one wall 252 capable of receiving the primary pipe 46 and defining a flow channel 262 therebetween. Preferably, at least one of the wall(s) 252 is crush and penetration resistant. Moreover, the secondary conduit 248 can be flexible. As illustrated in FIG. 4A, at least a section of the exterior surface 250 of the secondary conduit 248 can be corrugated. In addition, at least a section of one of the walls 50 is preferably also substantially impervious to fluids.

The conduit 248 can include exterior and interior layers, 253 and 254. While the exterior layer 253 preferably comprises the corrugated exterior surface 250, the interior layer 254 can comprise an at least semi-smooth liner. Providing such an interior layer 254 can, for example, facilitate the installation and/or retraction of the primary pipe 46, improve escape and/or intrusion detection capabilities (e.g., by allowing escaped product to flow quickly to any included detectors/sensors), and/or ease the recovery of any contained product (e.g., by reducing the likelihood that the product or any contaminants will become entrapped in the secondary conduit 248).

Alternatively, the secondary conduit 248 can comprise a jacket 60 generally surrounding the primary pipe 46. The jacket 60 can provide, for example, secondary product containment. Preferably, the jacket 60 also cooperates with the primary pipe 46 to define an interstitial space (e.g., a flow channel), is corrosion resistant, and is not subject to microbial attack. In a further preferred embodiment, both a secondary conduit 248 and a jacket 60 are utilized.

When a fitting according to the present invention is provided with a throughbore capable of allowing both the primary pipe 46 and the flow passage 262 to communicate therethrough, the fitting can be utilized in a transfer and containment system to coaxially transfer and contain, for example, product and vapor. In a preferred embodiment, the primary pipe 46 would be placed in fluid communication with a pump and a product passage of a nozzle, while the flow passage 262 would be placed in fluid communication with a UST 20 and the vapor passage of the nozzle. For example, as can be understood by one of ordinary skill in the art, coaxial pumps, shear valves, and other devices could be utilized to allow the transfer and containment of product and vapor from a UST 20 to a vapor recovery hose having product and vapor passages. Alternatively, the product and vapor can be coaxially transferred and contained only in selected portions of the containment system.

The foregoing description of the preferred embodiments of the present invention has been presented for purposes of illustration and description. It is not intended to be exhaustive or to limit the invention to the precise form disclosed, and modifications and variations are possible in light of the above teachings. For example, although a number of materials and shapes have been described or shown for use in the preferred embodiments of the present invention, it is to be understood that other materials and shapes could be used as alternatives to those described or shown, without departing from the scope of the invention.

In particular, while the present invention is particularly suited for use with petroleum-based substances, such as hydrocarbon fuels and/or vapors, it is contemplated that the present invention can be adapted to transfer, contain, and/or exclude other fluid products as desired. Moreover, the present invention could also be utilized in applications where no fluid products are involved, such as with containment systems for wiring, or where the secondary substance is not associated with the primary substance. Furthermore, for example, although the grooves and raised sections on the exterior of the conduit are shown in the various figures as being at generally right angles to one another, these grooves and raised section could also be formed in a variety of different shapes and sizes.

Thus, it should be understood that the embodiments were chosen and described in order to best illustrate the principals of the invention and its practical application. This illustration was provided to thereby enable one of ordinary skill in the art to best utilize the invention in various embodiments and with various modifications as are suited for the particular use contemplated. Accordingly, it is intended that the scope of the invention be defined by the claims appended hereto.

We claim:

1. A fitting for conduit comprising:
   a body having a wall and a throughbore, said wall having a smooth interior surface along its length;
   an acceptor disposed along the interior surface of the wall and being capable of providing a sealing interface between the throughbore and conduit that may be received by the fitting; and
   a clasp comprising a slot disposed along an intermediate portion of the clasp and configured to receive one or more protrusions on said body, the clasp having a first portion adapted to be received in a groove on conduit after the conduit is received by the fitting, and being capable of securing a portion of conduit that may be received by the fitting with respect to the body, the clasp configured to surround a portion of the body exterior of the acceptor to retain the conduit within the fitting.

2. The fitting according to claim 1, wherein the acceptor comprises a space defined between the interior surface of the wall of the body and a lip connected to the body.

3. The fitting according to claim 2, wherein the lip comprises a substantially rigid sleeve arranged generally parallel to the interior surface of the wall of the body.

4. The fitting according to claim 3, wherein an end of the sleeve is chamfered.

5. The fitting according to claim 2, wherein the lip and body are integrally connected.

6. The fitting according to claim 1, wherein a first end of the body defines an opening capable of receiving conduit that may be received by the fitting, and wherein the clasp is capable of securing a portion of conduit adjacent the opening to the body.

7. The fitting according to claim 1, further comprising a protrusion extending from the body, and wherein the clasp is adapted to receive the protrusion.

8. The fitting according to claim 7, wherein the protrusion is disposed on an exterior surface of the wall substantially adjacent a first end of the wall.

9. The fitting according to claim 1, wherein the clasp is comprised of opposing generally semicircular halves.

10. The fitting according to claim 1, further comprising a fastener for securing the clasp with respect to the body.

11. The fitting according to claim 1, further comprising a seal capable of cooperating with the acceptor and conduit that may be received by the fitting to form the sealing interface.

12. The fitting according to claim 11, wherein the seal is capable of cooperating with a groove on conduit that may be received by the fitting to form the sealing interface.

13. The fitting according to claim 12, wherein the seal comprises a ring having a generally T-shaped conformation.

14. The fitting according to claim 1, wherein a second end of the body is adapted to cooperate with another fitting.

15. The fitting according to claim 14, wherein the second end of the body is threaded.

16. The fitting according to claim 14, wherein the second end of the body is connected to a second fitting, the throughbores of the first and second fittings being in fluid communication.

17. The fitting according to claim 14, wherein the second end of the body is connected to a plurality of fittings, the throughbores of the plurality of fittings being in fluid communication.

18. The fitting according to claim 1, wherein a second end of the body is adapted to cooperate with a second conduit.

19. The fitting according to claim 1, wherein at least a portion of an external surface of the body is adapted to be received by a wrench.

20. The fitting according to claim 1, wherein the clasp is configured so that a depth into which the first portion of the clasp can be received in a groove on conduit is predefined.

21. The fitting according to claim 1, wherein the clasp is configured to be received in a groove on conduit along substantially an entire length of the groove.

22. A containment system comprising:
a conduit having at least one wall and a flow passage;
a fitting comprising:
a body having a wall and a throughbore, said wall being free from protrusions;
an acceptor disposed along the wall of the body, and receiving a portion of the at least one wall of the conduit;
a sealing interface between the throughbore and the flow passage;
a clasp comprising a slot disposed along an intermediate portion of the clasp and configured to receive one or more protrusions on said body cooperating with the body, a first portion of the clasp being received in a groove on the at least one wall of the conduit after the acceptor receives the portion of the at least one wall of the conduit, wherein the clasp secures the portion of the at least one wall of the conduit with respect to the body, the clasp configured to surround a portion of the body exterior of the acceptor to retain the conduit within the fitting.

23. The containment system according to claim 22, wherein the acceptor comprises a space defined between an interior surface of the wall of the body and a lip connected to the body.

24. The containment system according to claim 22, further comprising a protrusion extending from the body, and wherein the clasp receives the protrusion.

25. The containment system according to claim 22, wherein a seal cooperates with a groove on the at least one wall of the conduit to form the sealing interface.

26. The containment system according to claim 23, wherein the lip comprises material having a first coefficient of thermal expansion and the at least one wall of the conduit comprises material having a second coefficient of thermal expansion, the first coefficient of thermal expansion being less than the second coefficient of thermal expansion.

27. The containment system according to claim 22, wherein the clasp is configured so that a depth into which the first portion of the clasp is received in the groove on the at least one wall of the conduit is predefined.

28. The containment system according to claim 22, wherein the clasp is configured to be received in the groove on the at least one wall of the conduit along substantially an entire length of the groove.

29. The containment system according to claim 28, wherein the groove extends substantially around a perimeter of the conduit.

30. A fitting for conduit comprising:
a body having a wall and a throughbore, said wall having a smooth interior surface along its length;
an acceptor disposed along the interior surface of the wall and being capable of providing a sealing interface between the throughbore and conduit that may be received by the fitting;
a clasp comprising a slot disposed along an intermediate portion of the clasp for cooperating with the body, the clasp having a first portion adapted to be received in a groove on conduit that may be received by the fitting, the first portion being adapted to be received along substantially an entire length of the groove, and the clasp being capable of securing a portion of conduit that may be received by the fitting with respect to the body; and
a clamp configured to surround a portion of the clasp for securing a portion of the clasp with respect to the body and for retaining the conduit within the fitting.

31. The fitting according to claim 30, wherein the clasp is configured so that a depth into which the first portion of the clasp can be received in a groove on conduit is predefined.

32. A fitting for conduit comprising:
a body comprising a surface for mating with a clasp, said body having a wall and a throughbore, said wall having a smooth interior surface along its length;
an acceptor disposed along the interior surface of the wall and being capable of providing a sealing interface between the throughbore and conduit that may be received by the fitting;
said clasp configured to surround a portion of the body exterior to the acceptor and configured to mate with the body to retain the conduit within the fitting, the clasp having a first portion adapted to be received in a groove on conduit that may be received by the fitting, the clasp being configured so that a depth into which the first portion of the clasp can be received in a groove on conduit is predefined, and the clasp being capable of securing a portion of conduit that may be received by the fitting with respect to the body.

33. The fitting according to claim 32, wherein the clasp is configured to be received in a groove on conduit along substantially an entire length of the groove.

* * * * *

UNITED STATES PATENT AND TRADEMARK OFFICE
CERTIFICATE OF CORRECTION

PATENT NO.      : 6,371,154 B1
DATED           : April 16, 2002
INVENTOR(S)     : James E. Kesterman et al.

It is certified that error appears in the above-identified patent and that said Letters Patent is hereby corrected as shown below:

Title page,
After Assignee, change "Fisces" to -- PISCES --.

Column 8,
Line 61, change "AT-connection" to -- A T-connection --.

Signed and Sealed this

Eighteenth Day of June, 2002

*Attest:*

JAMES E. ROGAN
*Attesting Officer*  *Director of the United States Patent and Trademark Office*